United States Patent
Redl

(10) Patent No.: US 11,519,766 B2
(45) Date of Patent: Dec. 6, 2022

(54) FLOW MEASURING DEVICE WITH A TESTING DEVICE

(71) Applicants: Redl GmbH, Hollabrunn (AT); INNOVATIVE TAP SOLUTIONS, INC., Wheeling, IL (US)

(72) Inventor: Hermann Redl, Hollabrunn (AT)

(73) Assignees: REDL GMBH; INNOVATIVE TAP SOLUTIONS, INC., Wheeling, IL (US)

(*) Notice: Subject to any disclaimer, the term of this patent is extended or adjusted under 35 U.S.C. 154(b) by 0 days.

(21) Appl. No.: 17/369,574

(22) Filed: Jul. 7, 2021

(65) Prior Publication Data
US 2022/0011142 A1    Jan. 13, 2022

(30) Foreign Application Priority Data

Jul. 7, 2020   (AT) .............................. A 50581/2020

(51) Int. Cl.
| | |
|---|---|
| *G01F 1/075* | (2006.01) |
| *G01F 1/05* | (2006.01) |
| *G01F 1/06* | (2006.01) |
| *G01F 25/10* | (2022.01) |
| *B67D 1/08* | (2006.01) |
| *B67D 7/32* | (2010.01) |
| *B67D 7/34* | (2010.01) |

(52) U.S. Cl.
CPC .............. *G01F 1/075* (2013.01); *G01F 25/10* (2022.01); *B67D 1/0855* (2013.01); *B67D 7/32* (2013.01); *B67D 7/34* (2013.01); *G01F 1/05* (2013.01); *G01F 1/06* (2013.01)

(58) Field of Classification Search
CPC ... G01F 1/075; G01F 1/05; G01F 1/06; G01F 25/10; B67D 1/0855; B67D 7/32; B67D 7/34
See application file for complete search history.

(56) References Cited

U.S. PATENT DOCUMENTS

| | | | |
|---|---|---|---|
| 2012/0096920 A1 | 4/2012 | Martinez et al. | |
| 2012/0271567 A1* | 10/2012 | Da Pont ................. | G01F 1/115 702/45 |
| 2017/0138772 A1* | 5/2017 | Neilson ................... | G01F 1/053 |

FOREIGN PATENT DOCUMENTS

| | | |
|---|---|---|
| CN | 2455553 Y | 10/2001 |
| DE | 19725977 A1 | 12/1998 |
| DE | 102005016374 A1 | 10/2006 |
| WO | 2011077412 A1 | 6/2011 |

* cited by examiner

*Primary Examiner* — Randy W Gibson
*Assistant Examiner* — John M Royston
(74) *Attorney, Agent, or Firm* — Nguyen Tarbet LLC

(57) ABSTRACT

The invention relates to an arrangement of a flow measuring device with a testing device. The flow measuring device comprises an inlet section and an outlet section. A rotor is arranged between the inlet section and the outlet section. The rotor is designed for a rotational movement in the event of a fluid flow between the inlet section and the outlet section. At least one indicator element is arranged on the rotor. The flow measuring device further comprises a measuring element, which is adapted to detect a movement of the indicator element. The indicator element comprises a magnetic material. The testing device is designed to set the rotor in rotational motion, preferably without contact. The invention further relates to a method for the functional testing of a flow measuring device.

15 Claims, 1 Drawing Sheet

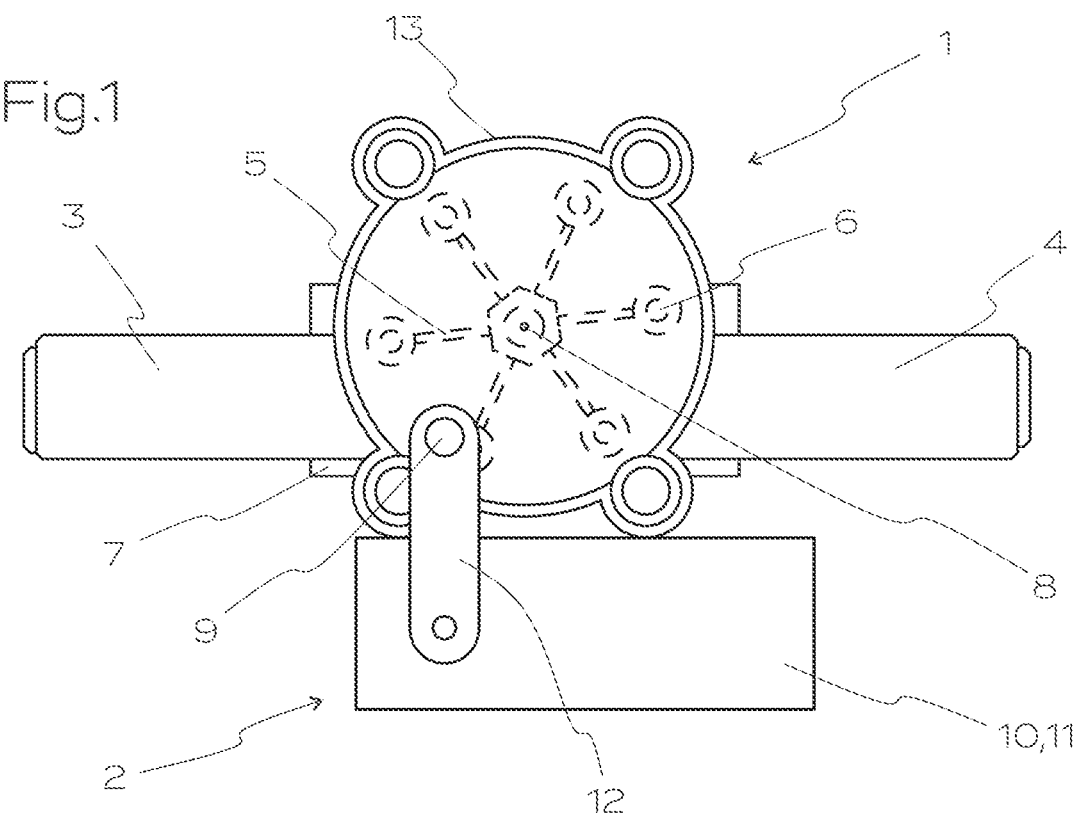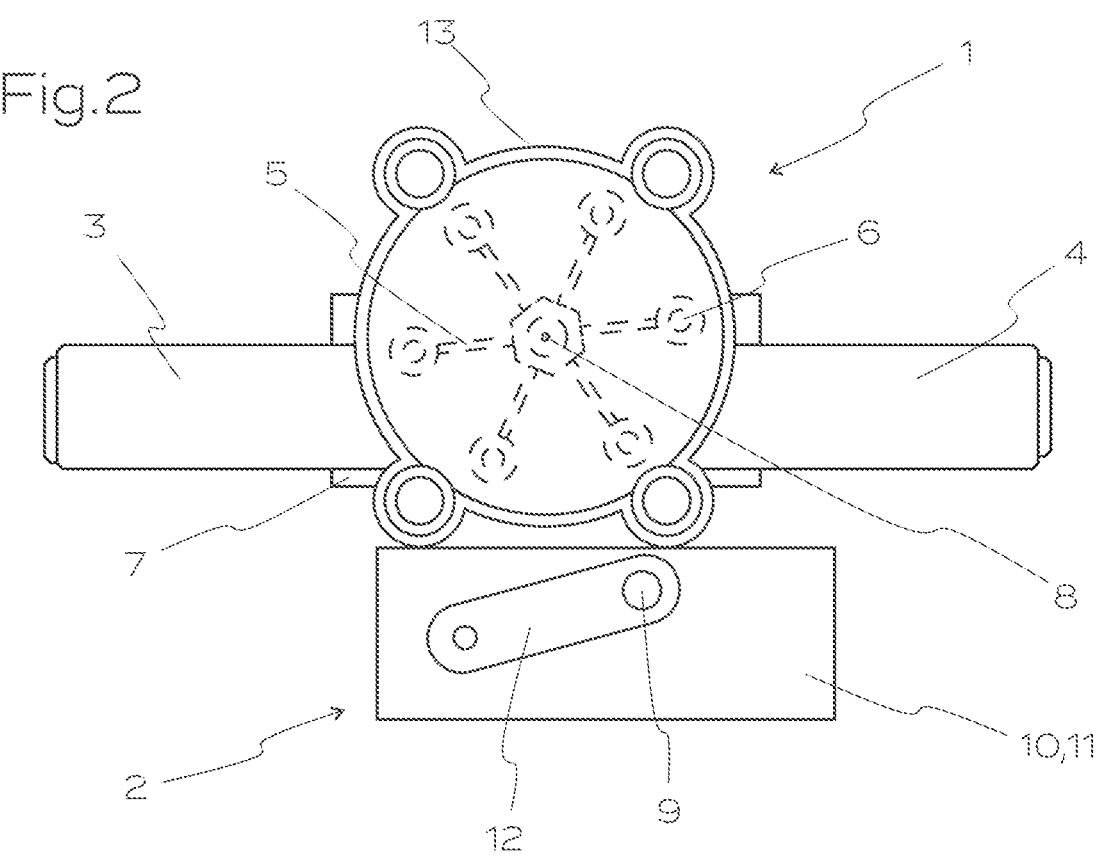

FLOW MEASURING DEVICE WITH A TESTING DEVICE

CROSS-REFERENCES TO RELATED APPLICATIONS

This application claims benefit of Austrian Patent Application No. A 50581/2020 filed Jul. 7, 2020, the specification(s) of which is/are incorporated herein in their entirety by reference.

FIELD OF THE INVENTION

The present invention relates to an arrangement and a method in accordance with the preamble of the independent claims. In particular, the invention relates to an arrangement of a flow measuring device with a testing device and a method for the functional testing of a flow measuring device.

BACKGROUND OF THE INVENTION

Different kinds of beverage dispensers or beverage dispensing systems are known in the prior art. In order to reduce the staff costs in culinary establishments and offer guests greater flexibility when it comes to beverage selection and consumption, self-service beverage dispensers or self-service beverage dispensing systems suitable for dispensing a variety of different beverages have been proposed. To control the dispensing of beverages from such self-service dispensing systems, different types of control systems are used.

For example, self-service dispensing systems are known in which the guest selects the desired beverage on a touch screen, takes a certain quantity, and then pays the required amount using a common payment system, such as a credit card. In such dispensing systems, a flow measuring device is usually assigned to each beverage, via which the quantity of beverage dispensed is measured.

In the event of a defect in the flow measuring device, however, the problem arises that a beverage can be dispensed, but the dispensed quantity is not registered and the consumer is therefore not charged. This means that the beverage in question can be dispensed free of charge. The information about such a defect spreads quickly among the guests and as a result the beverage in question is preferentially tapped. Moreover, it often happens that the defect cannot be detected for a long time, since the beverage is dispensed properly despite the malfunction of the flow measuring device. The result is a high financial loss for the operator of the self-service dispensing system.

The flow measuring devices used in such dispensing systems usually have a rotor, which is equipped with an indicator element made of a magnetic material, the movement of which is detected by a corresponding sensor. The number of revolutions of the rotor as a function of time is proportional to the flow rate, which makes it easy to determine to amount of the dispensed beverage.

Functional testing of the flow measuring device is difficult with existing means, since additional variables, such as an empty supply container, can result in no flow being detected.

It is therefore an object of the present invention to overcome the disadvantages of the prior art and to minimize the possible financial damage that can result for an operator from a defective flow measuring device and to provide a testing device with the aid of which the function of a flow measuring device can be determined quickly and without doubt.

This object is solved by the characterizing features of the independent claims.

BRIEF SUMMARY OF THE INVENTION

Thus, the present invention relates to an arrangement of a flow measuring device with a testing device, wherein the flow measuring device comprises an inlet section and an outlet section, wherein a rotor is arranged between the inlet section and the outlet section, the rotor being designed for a rotational movement in the event of a fluid flow between the inlet section and the outlet section, wherein at least one indicator element is arranged on the rotor, wherein the flow measuring device comprises a measuring element, which is adapted to detect a movement of the indicator element, and wherein the indicator element comprises or consists of a magnetic material.

In particular, the intended flow direction is from the inlet section to the outlet section.

According to the invention, it is provided that the testing device is designed to set the rotor in rotational motion. Preferably, the testing device is designed to set the rotor in rotational motion without contact.

When the rotor is set in rotation by the action of the testing device, the measuring element detects an apparent flow, which is not caused by the dispensing of a beverage but by the movement of the rotor caused by the testing device. This measurement serves to determine whether the flow measuring device works properly. If no apparent flow is detected during operation of the testing device, it can be assumed that the flow measuring device is defective.

For example, such a functional testing may take place before the start of the operating time of the dispensing system. If a defective flowmeter is detected, the respective beverage line may remain disabled until the damage is repaired, which prevents further financial loss caused by the possible free-of-charge consumption of beverages.

When the functional testing is contactless, no additional elements or components need to be installed in the beverage line; thus, no further hygiene requirements must be met. Thus, the testing device preferably does not contact the beverage.

In particular, the testing device is arranged as an additional element outside the flow measuring device. Thereby, the testing device can be added to existing systems.

Optionally, it is provided that the indicator element is arranged at a distance from the rotational axis of the rotor. This allows for a reliable detection of the rotational movement of the rotor. One or more indicator elements may be arranged on the rotor.

Optionally, it is provided that the indicator element is or comprises a permanent magnet. Thereby, the flow measuring device is of a particularly simple design, as the inherent magnetism of the permanent magnet may be used for the detection of the rotation.

Optionally, it is provided that the testing device comprises a magnetic element, wherein the magnetic element preferably is or comprises a permanent magnet.

Thus, the testing device is optionally adapted to set the rotor in rotational motion by means of a magnetic interaction. In particular, the magnetic interaction between the indicator element of the rotor and a magnetic element of the testing device can be used. By combining two permanent magnets, a low-maintenance design is achieved that enables a contactless drive. The indicator element and the magnetic element can preferably be designed in such a way that their magnetic interaction is strong enough to cause a corresponding movement (attraction or repulsion) of the indicator element when the magnetic element moves, thus setting the rotor in motion. For this purpose, the strength of the magnetic field of permanent magnets and the distance between the components may be selected according to the requirements.

Optionally, it is provided that the testing device comprises a movement means, which is designed to move the magnetic element relative to the flow measuring device, wherein the movement means is or comprises a motor. The movement means may be manually controlled and may, for example, be coupled to a central control unit, such as a computer. Optionally, the movement means may also be automatically controlled by a control unit. For example, as part of a test sequence, the control unit may control the movement means and by communicating with the flow measuring device, its function can be determined automatically.

Optionally, a testing and control device is provided, which is designed to control the movement of the testing device and check the function of the flow measuring device.

Optionally, it is provided that the movement means is connected to the magnetic element via a swivel arm. For example, the swivel arm may be adapted to pivot the magnetic element of the testing device from a first position to a second position. Optionally, a pivoting is enabled between 0° and 90°, for example between 0° and 45°.

Optionally, in the second position no substantial magnetic interaction occurs between the indicator element and the magnetic element. Thereby, the risk of impairing the measurement can be reduced.

Optionally, the movement means may be designed to move the magnetic element between a first position and a second position. In this case, the movement means may be a servomotor, for example. Alternatively, the movement means may be designed to move the magnetic element along a circular path. In particular, the movement means may be designed to set the magnetic element in rotation.

Optionally, it is provided that the motor is one selected from a group consisting of a linear motor and a servomotor. Other well-known motors are also suitable if they fulfil the desired purpose of the drive.

Optionally, it is provided that the indicator element of the rotor and the magnetic element of the testing device are permanent magnets, wherein the permanent magnets face each other with opposite polarities. Thus, the permanent magnets can face each other with those polarities which attract each other. This enables a particularly efficient drive of the rotor. Alternatively, the permanent magnets can face each other with the same polarities.

Optionally, it is provided that the measuring element is or comprises a Hall sensor. A Hall sensor is suitable for detecting a relative movement of a magnetic material. Optionally, the measuring element may be designed as a magnetic sensor element.

Optionally, it is provided that the rotor is arranged between the measuring element and the magnetic element. This prevents a possible interference of the magnetic field between the indicator element and the measuring element with the magnetic field between the indicator element and the magnetic element.

Optionally, a beverage dispenser may comprise one or more arrangements according to the invention. Thus, the invention further relates to a beverage dispenser with one or more arrangements according to the invention.

The present invention further relates to a method for the functional testing of a flow measuring device with an inlet section and an outlet section, wherein a rotor is provided between the inlet section and the outlet section, the rotor being designed for a rotational movement in the event of a fluid flow between the inlet section and the outlet section, wherein at least one indicator element is arranged on the rotor, wherein the flow measuring device comprises a measuring element, which is adapted to detect a movement of the magnetic element, and wherein the indicator element comprises or consists of a magnetic material.

According to the invention, it may be provided that the method comprises the following steps:

setting the rotor in rotational motion by means of a testing device, the setting preferably taking place without contact, and detecting the rotation of the rotor by means of the measuring element of the flow measuring device.

Optionally, the flow measuring device and the testing device of the method have the features of the arrangement according to the invention. Optionally, the invention relates to a method for the functional testing of a flow measuring device using an arrangement according to the invention.

Optionally, it is provided that there is substantially no fluid flow between the inlet section and the outlet section during the functional testing. This means in particular that there is no liquid flow through the flow measuring device. There may be a small flow due to the movement of the rotor, but this is encompassed by the meaning of "substantially no fluid flow".

Optionally, it is provided that the rotor is set in rotational motion by means of a magnetic element of the testing device.

Further features of the invention arise from the claims, the figures and the description of the exemplary embodiment.

BRIEF DESCRIPTION OF THE SEVERAL VIEWS OF THE DRAWING(S)

The figures show:

FIG. 1 a schematic lateral view of an arrangement according to the invention according to a first exemplary embodiment in a first position; and FIG. 2 a schematic lateral view of an arrangement according to the invention according to the first exemplary embodiment in a second position.

DETAILED DESCRIPTION OF THE INVENTION

In the following, the present invention is described by means of an exemplary embodiment. The exemplary embodiment merely illustrates the invention and is not intended to limit the scope of protection of the claims.

Following is a list of reference signs corresponding to a particular element referred to herein:

1 flow measuring device
2 testing device
3 inlet section
4 outlet section
5 rotor
6 indicator element
7 measuring element
8 rotational axis
9 magnetic element
10 movement means
11 motor
12 swivel arm
13 housing FIGS. 1 and 2 show schematic lateral views of an arrangement according to the invention according to a first exemplary embodiment in a first position and a second position, respectively. Except for the position of the swivel arm 12 and the magnetic element 9, FIGS. 1 and 2 are the same and are therefore described together below.

The arrangement comprises a flow measuring device 1 and a testing device 2.

The flow measuring device 1 has an inlet section 3 and an outlet section 4 and may, for example, be integrated into a beverage dispensing system. When the flow measuring device 1 is used in a beverage dispensing system, the inlet section 3 may be connected to a beverage reservoir and the outlet section 4 may be connected to a tap (not shown). Thereby, the flow measuring device 1 can be used to determine the amount of beverage being dispensed. The flow measuring device 1 may be connected to a corresponding control device.

A rotor 5 is arranged between the inlet section 3 and the outlet section 4, which is shown with a dashed line, as it is located behind the housing 13 of the flow measuring device 1. The rotor 5 is mounted movably about a rotational axis 8 and has six indicator elements 6, which are designed as permanent magnets.

In case liquid, such as a beverage, flows through the flow measuring device 1, the rotor 5 is set in motion. The measuring element 7, which in this example is a Hall sensor, detects the movement of the magnetic indicator elements 6 so that the flow rate of the liquid can be determined.

A testing device 2 is arranged on the flow measuring device 1, the testing device comprising a movement means 10, which is designed as a motor 11, in particular as a servomotor. The motor 11 is connected to a magnetic element 9 via a swivel arm 12 in order to move the magnetic element 9 between a first and a second position. The first position is shown in FIG. 1, while the second position is shown in FIG. 2.

The magnetic element 9 is designed as a permanent magnet, wherein the permanent magnets of the indicator elements 6 and of the magnetic element 9 face each other. I. e. the magnetic element 9 and the indicator elements 6 magnetically attract each other.

In this exemplary embodiment, the swivel arm 12 moves periodically between the two positions, but does not move completely in a circle. The magnetic interaction between the moving magnetic element 9 and the indicator elements 6 sets the rotor 5 in rotational motion without contact, although there is no liquid flow. This movement may be detected by the measuring element 7 as an apparent flow. A flow possibly caused by the rotational motion of the rotor 5 of liquid that remains in the flow measuring device 1 can be neglected during the measurement.

To prevent the magnetic field of the magnetic element 9 from influencing the measurement, the rotor 5 is arranged between the measuring element 7 and the magnetic element 9. This ensures a sufficient distance between the magnetic element 9 and the measuring element 7.

The functional testing can be done by visually reading a measured value. Alternatively, the functional testing can be done automatically by means of an electronic testing and control device, e.g. a computer. The testing and control device may be configured to perform the testing automatically at specific times, to detect malfunctions and, optionally, to shut down the beverage delivery, once a malfunction is detected.

In other exemplary embodiments not shown, the magnetic element 9 may be moved in ways different from the first exemplary embodiment. For example, the swivel arm 12 may be moved completely in a circle. Alternatively, the magnetic element 9 may be guided along a guide rail.

In another exemplary embodiment not shown, same polarities of the permanent magnets may face each other so that the magnetic element 9 and the indicator elements 6 magnetically repel each other. This orientation may also be used for a contactless drive of the rotor 5.

What is claimed is:

1. An arrangement of a flow measuring device (1) with a testing device (2), wherein
   a. the flow measuring device (1) comprises an inlet section (3) and an outlet section (4), wherein
   b. a rotor (5) is arranged between the inlet section (3) and the outlet section (4), the rotor (5) being designed for a rotational movement in the event of a fluid flow between the inlet section (3) and the outlet section (4), wherein
   c. at least one indicator element (6) is arranged on the rotor (5), wherein
   d. the flow measuring device (1) comprises a measuring element (7), which is adapted to detect a movement of the indicator element (6), and wherein
   e. the indicator element (6) comprises a magnetic material,
   characterized in that the testing device (2) is designed to set the rotor (5) in rotational motion.

2. The arrangement according to claim 1, characterized in that the indicator element (6) is arranged at a distance from the rotational axis (8) of the rotor (5).

3. The arrangement according to claim 1, characterized in that the indicator element (6) is or comprises a permanent magnet.

4. The arrangement according to claim 1, characterized in that the testing device (2) comprises a magnetic element (9).

5. The arrangement according to claim 4, characterized in that the magnetic element (9) is or comprises a permanent magnet.

6. The arrangement according to claim 4, characterized in that the testing device (2) comprises a movement means (10), which is designed to move the magnetic element (9) relative to the flow measuring device (1), wherein the movement means (10) is or comprises a motor (11).

7. The arrangement according to claim 6, characterized in that the movement means (10) is connected to the magnetic element (9) via a swivel arm (12).

8. The arrangement according to claim 6, characterized in that the motor (11) is a selected one from a group consisting of a linear motor and a servomotor.

9. The arrangement according to claim 7, characterized in that the swivel arm (12) is designed to pivot the magnetic element (9) from a first position to a second position, wherein optionally a pivoting between 0° and 90° is enabled.

10. The arrangement according to claim 4, characterized in that the indicator element (6) of the rotor (5) and the magnetic element (9) of the testing device (2) are permanent magnets, wherein the permanent magnets face each other with opposite polarities.

11. The arrangement according to claim 1, characterized in that the measuring element (7) is or comprises a Hall sensor.

12. The arrangement according to claim 4, characterized in that the rotor (5) is arranged between the measuring element (7) and the magnetic element (9).

13. A method for the functional testing of a flow measuring device (1) with an inlet section (3) and an outlet section (4), wherein a. a rotor (5) is provided between the inlet section (3) and the outlet section (4), the rotor (5) being designed for a rotational movement in the event of a fluid flow between the inlet section (3) and the outlet section (4), wherein
b. at least one indicator element (6) is arranged on the rotor (5), wherein
c. the flow measuring device (1) comprises a measuring element (7), which is adapted to detect a movement of the magnetic element (6), and wherein
d. the indicator element (6) comprises a magnetic material, characterized in that the method comprises the following steps:

setting the rotor (5) in rotational motion by means of a testing device (2), and detecting the rotation of the rotor (5) by means of the measuring element (7) of the flow measuring device (1).

14. The method according to claim 13, characterized in that there is substantially no fluid flow between the inlet section (3) and the outlet section (4) during the functional testing.

15. The method according to claim 13, characterized in that the rotor (5) is set in rotational motion by means of a magnetic element (9) of the testing device (2).

\* \* \* \* \*